United States Patent
Johansson et al.

(10) Patent No.: US 9,015,485 B1
(45) Date of Patent: *Apr. 21, 2015

(54) RISK-BASED AUTHENTICATION DURATION

(71) Applicant: Amazon Technologies, Inc., Reno, NV (US)

(72) Inventors: Jesper M. Johansson, Redmond, WA (US); Darren E. Canavor, Redmond, WA (US); Daniel W. Hitchcock, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/176,544

(22) Filed: Feb. 10, 2014

Related U.S. Application Data

(63) Continuation of application No. 13/314,943, filed on Dec. 8, 2011, now Pat. No. 8,683,597.

(51) Int. Cl.
*H04L 9/32* (2006.01)
*H04L 29/06* (2006.01)
*G06F 21/51* (2013.01)
*G06F 21/30* (2013.01)

(52) U.S. Cl.
CPC ............ *H04L 63/08* (2013.01); *G06F 21/51* (2013.01); *G06F 21/30* (2013.01); *H04L 63/083* (2013.01)

(58) Field of Classification Search
CPC ......... G06F 21/30; G06F 21/51; G06F 11/00; H04L 63/08; H04L 63/083
USPC ................ 726/1–5, 22–26; 713/168; 709/229
See application file for complete search history.

(56) References Cited

U.S. PATENT DOCUMENTS

| | | | |
|---|---|---|---|
| 7,124,181 B1 * | 10/2006 | Magdych et al. | 709/224 |
| 2006/0212931 A1 * | 9/2006 | Shull et al. | 726/10 |
| 2006/0277591 A1 * | 12/2006 | Arnold et al. | 726/1 |
| 2007/0239606 A1 * | 10/2007 | Eisen | 705/51 |
| 2008/0034209 A1 * | 2/2008 | Dickinson et al. | 713/168 |
| 2009/0024589 A1 * | 1/2009 | Sood et al. | 707/3 |
| 2009/0113062 A1 * | 4/2009 | Woodman | 709/229 |
| 2009/0199264 A1 * | 8/2009 | Lang | 726/1 |
| 2011/0154434 A1 * | 6/2011 | Hernacki | 726/1 |
| 2011/0247069 A1 * | 10/2011 | Slater | 726/22 |
| 2012/0069131 A1 * | 3/2012 | Abelow | 348/14.01 |
| 2012/0144461 A1 * | 6/2012 | Rathbun | 726/5 |

* cited by examiner

*Primary Examiner* — Samson Lemma

(74) *Attorney, Agent, or Firm* — Thomas | Horstemeyer, LLP

(57) ABSTRACT

Disclosed are various embodiments that perform confidence-based authentication of a user. A request from a user is obtained, where the request pertains to an operation on a network site. An authentication duration for the user is determined, based on a risk to the user of performing the operation. A determination is made whether a current session associated with the user has expired, based on the authentication duration. The operation requested by the user is performed in response to the determination that the current session associated with the user has expired.

20 Claims, 5 Drawing Sheets

RISK-BASED AUTHENTICATION DURATION

CROSS-REFERENCE TO RELATED APPLICATIONS

This application is a continuation of and claims the benefit of U.S. patent application Ser. No. 13/314,943, entitled "RISK-BASED AUTHENTICATION DURATION," and filed Dec. 8, 2011, which is hereby incorporated by reference in its entirety.

BACKGROUND

Verifying the identity of a person or group of people, referred to as authentication, has many uses in the context of computing. People often have multiple user accounts that employ some type of authentication before access to the account is granted. For example, a person may have accounts in the operating systems of their computing devices, accounts with social networking sites, accounts with online retailers, and so on. In many cases, the authentication is valid for a limited period of time, so that the user can continue to interact with the computer or network site during this period, but when the period expires, the user must be authenticated again.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to authentication systems. Authentication typically involves a user presenting a name and a password, a key, a personal identification number, and/or another form of security credential. Once a user is authenticated, the authentication is in effect for some period of time. After the authentication duration has expired, re-authentication may be required. Various embodiments of the present disclosure implement an authentication system which varies the authentication duration according to the risk that the requested operation presents to the user. For example, browsing a network site may be considered low risk where purchasing a product through a network site may be considered high risk. When a user makes a request to perform an operation on a network site that is considered relatively risky, a shorter authentication duration is applied. In this manner, users re-authenticate more frequently for risky operations. In the following discussion, a general description of the system and its components is provided, followed by a discussion of the operation of the same.

Figure 1:
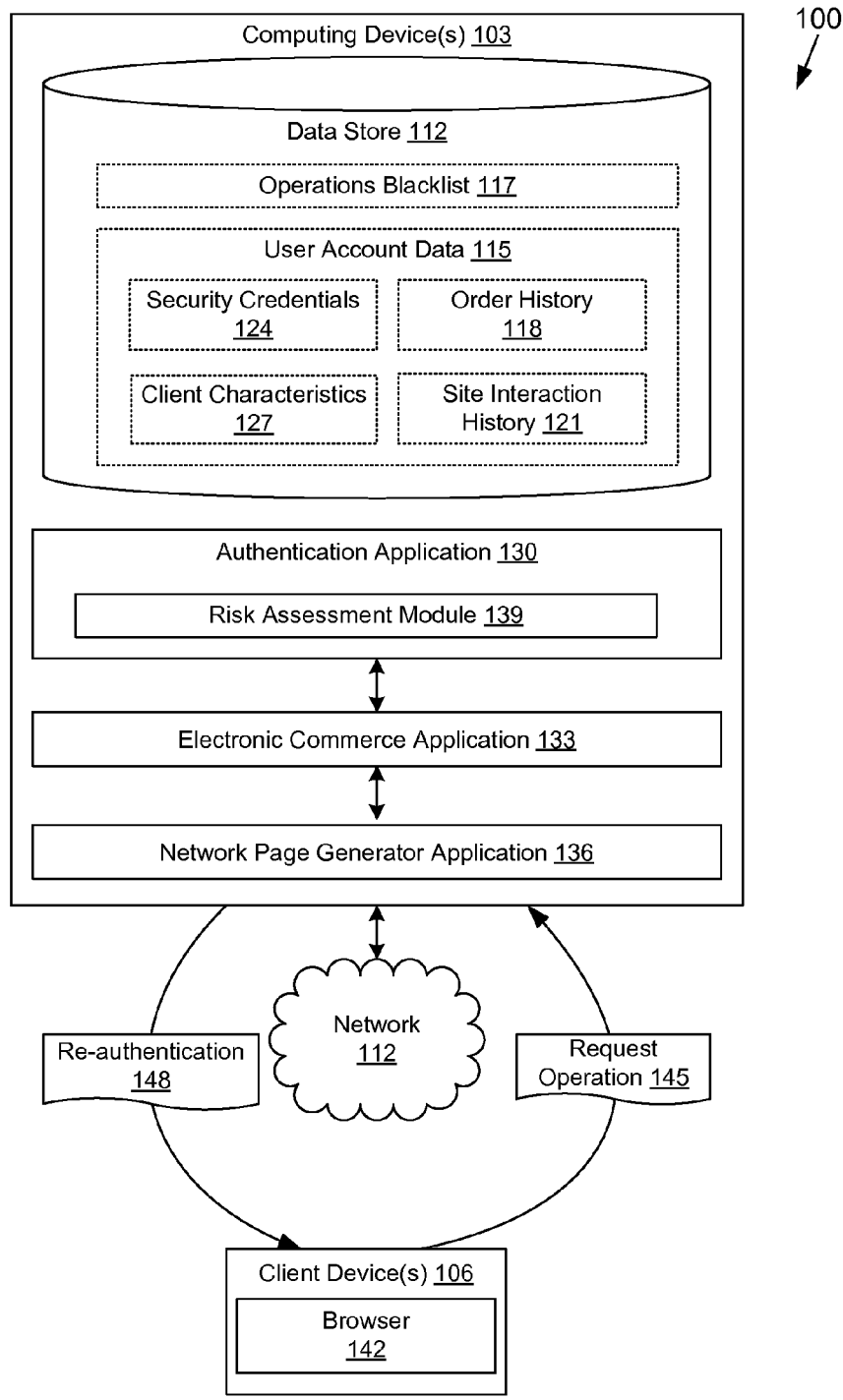
FIG. 1 is a drawing of a networked environment according to various embodiments of the present disclosure.

With reference to FIG. 1, shown is a networked environment 100 according to various embodiments. The networked environment 100 includes one or more computing devices 103 in data communication with one or more client devices 106 by way of a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. A plurality of computing devices 103 together may comprise, for example, a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 112 that is accessible to the computing device 103. The data store 112 may be representative of a plurality of data stores 112 as can be appreciated. The data stored in the data store 112, for example, is associated with the operation of the various applications and/or functional entities described below. The data stored in the data store 112 includes, for example, user account data 115, operations blacklist 117, and potentially other data. The user account data 115 includes data associated with various user accounts associated with a network application or a web application. The user account data 115 may include, for example, order history 118, site interaction history 121, security credentials 124, client characteristics 127, and/or other data.

The components executed on the computing device 103, for example, include an authentication application 130, an electronic commerce application 133, a network page generation application 136, and other applications, services, processes, systems, engines, or functionality not discussed in detail herein. These components may communicate with each other using various mechanisms, including but not limited to any type of middleware framework. Though shown as logically separate components, the functionality of the authentication application 130, electronic commerce application 133, and the network page generation application 136 can be combined and/or distributed in various ways, as can be appreciated.

The electronic commerce application 133 is executed in order to facilitate the online viewing and/or purchase of items and products over the network 109. To this end, the electronic commerce application 133 presents a network site which includes a set of network pages. In some embodiments, the network site takes the form of a web site, and the network pages take the form of web pages. The electronic commerce application 133 also performs various backend functions associated with the online presence of a merchant in order to facilitate the online purchase of items, as should be appreciated.

Users interacting with the electronic commerce application 133 may create user accounts with the electronic commerce operator. The electronic commerce application 133 may then store user-specific information as user account data 115 in the data store 112. For example, the electronic commerce application 133 may maintain an order history 118 corresponding to a purchase or transaction history for products, services, downloads, and/or other items associated with a particular user account. The order history 118 may include transaction data associated with purchase transactions, account enrollment transactions, etc. The electronic commerce application 133 may also maintain a site interaction history 121 corresponding to a record of a particular user's interactions with the network site. For example, the electronic commerce application 133 may track which network pages are visited by the user and/or which operations are performed on the electronic commerce application 133. Other examples of user account data 115 include an email address, a phone number, a shipping address, and payment option information.

The network page generation application 136 is executed to generate network pages which make up the network site presented to the user by the electronic commerce application 133. In some embodiments, these network pages describe items in a catalog maintained by the electronic commerce application 133. To this end, the authentication application 130 may use various types of data such as templates, executable code, interpreted code, hypertext markup language (HTML), extensible markup language (XML), images, video, text, graphics, and any other type of data that may be used in generating network pages. The authentication application 130 may include a network page server and/or other components. The network page server may comprise a commercially available hypertext transfer protocol (HTTP) server such as, for example, Apache® HTTP Server, Microsoft® Internet Information Services (IIS), and other servers.

The authentication application 130 is executed to authenticate users in order to authorize particular operations which a user may perform on the network site presented by the electronic commerce application 133. The electronic commerce application 133 requires authorization for some, but not necessarily all, operations which a user may perform on the network site. A representative list of operations includes, but is not limited to, browsing the network site, purchasing a product, viewing an order history, adding a new credit card, modifying data associated with an existing credit card, setting up a shipping address, and setting up a product return authorization. Some of these operations act on a user account, while others do not require a user account, as should be appreciated.

For operations which require authorization, the authentication application 130 obtains security credentials from the user. For example, the authentication application 130 may generate a user interface which includes a prompt for a login identifier and a password. The authentication application 130 validates the received credentials against security credentials 124 stored in the data store 112. Alternatively, the authentication application 130 may pass the received credentials on to another component for authentication. The security credentials 124 used by the authentication application 130 may include passwords, hashes of passwords, public-key encryption data, data to validate one-time passwords, data to validate personal identification number (PIN) values, biometric identity data, and/or other data. Once the authentication application 130 has authenticated the user for a particular operation, the electronic commerce application 133 proceeds to perform the requested operation. If the authentication application 130 fails to authenticate the user, the electronic commerce application 133 may refuse to perform the requested operation. It should be noted that during the authentication process, the authentication application 130 may determine that the most recent authentication has expired, and if so, may re-authenticate the user.

In authenticating the user for a particular operation on the network site, some embodiments of the authentication application 130 use a risk assessment module 139 to determine the level of risk which the operation presents to the user. In some embodiments, the risk assessment module 139 makes this determination using a lookup table, where a requested operation is provided as input and a risk for that operation is retrieved. The level of risk of an operation may depend on factors other than the type of operation requested. In such embodiments, the risk assessment module 139 may compute the risk value using the requested operation and/or other factors as input. Different factors may be given different weights, as should be appreciated. In some embodiments, the type of operation is used to determine a base risk and the base risk is then adjusted for other factors.

The risk assessment module 139 may further determine an authentication duration from the risk value. The authentication duration represents the maximum amount of time for which a user's authentication is valid. When this authentication period expires at the end of that duration, the user may require re-authentication before a particular operation on the network site is performed. Some embodiments of the risk assessment module 139 force a re-authentication for specific operations, regardless of the time of last authentication. Forced re-authentication may be required, for example, for any operation found on an operations blacklist 117 that is stored in the data store 112.

As will be described in further detail below, the risk assessment module 139 may use client characteristics 127 when determining the risk of a requested operation. The client characteristics 127 define various characteristics associated with the client devices 106 that are employed by users of the respective account. Such client characteristics 127 may include cookie information, client locations (e.g., ZIP codes, global positioning system (GPS) location coordinates, geolocation results, etc.), and internet protocol (IP) addresses. The client characteristics 127 may also include a description of the current hardware and/or software configuration of the client device 106.

The client device 106 is representative of a plurality of client devices that may be coupled to the network 109. The client device 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, kiosks, or other devices with like capability. The client device 106 may be configured to execute various applications such as a browser 142 and/or other applications. The client device 106 may be configured to execute applications beyond the browser 142 such as mobile applications, email applications, instant message applications, and/or other applications.

Next, a general description of the operation of the various components of the networked environment 100 is provided.

To begin, a user interacts with the network site presented by the electronic commerce application 133. This user interaction results in a user making a request to perform a particular operation 145 on the network site. For example, a user may browse the network site, add a product to a shopping cart, purchase a product, or change the expiration date of a credit card associated with the user's account. For some of these operations, the electronic commerce application 133 requires authentication, and in such cases, invokes the authentication application 130. If the user has not yet been authenticated, the authentication application 130 obtains security credentials from the user and authenticates the user through these credentials.

As part of the authentication process, the authentication application 130 may maintain a session and associated session state. Authentication sessions may be appropriate, for example, when interoperating with stateless protocols such as Hypertext Markup Language (HTML) which do not maintain their own state. An authentication application 130 enforces a maximum duration on an authenticated session. That is, when the authentication application 130 is requested to perform authentication, the authentication application 130 first determines whether or not a current authentication session is still valid. If the current session is still valid, the authentication application 130 does not perform authentication again, but instead relies on the previously established credentials and notifies the authentication requester (which may be the electronic commerce application 133) that the user has been successfully authenticated. If the current session is no longer valid because the authentication duration has expired, the authentication application 130 performs re-authentication 148 of the user. For example, the user may be prompted again for his user identifier and password.

The authentication application 130 relies on the risk assessment module 139 to set the authentication duration for a user session. Specifically, the risk assessment module 139 sets the authentication duration to a period which is appropriate for the amount of risk which a requested network site operation represents to the user. Thus, site operations which are considered relatively high risk to the user are given a larger authentication duration than the duration given to a low risk operations. As just one example, the authentication duration for a site browse operation may be set to one week while the authentication duration for an operation to change the shipping address associated with the user account may be set to five minutes. That is, the authentication session for a site browse operation expires after a week while the authentication session for a shipping address operation expires after only five minutes. The rationale is that even if browsing a network site could result in some harm to the user (for example, a malfunction of the client device 106), the user could be damaged to a much greater degree if another user purchases a product through the network site and ships the product to his own address, thus defrauding the actual owner of the user account. Although fraud is one example of a risk to the user of interaction with the network site, risk as used herein also encompasses other forms of economic or reputational harm.

Figure 2:
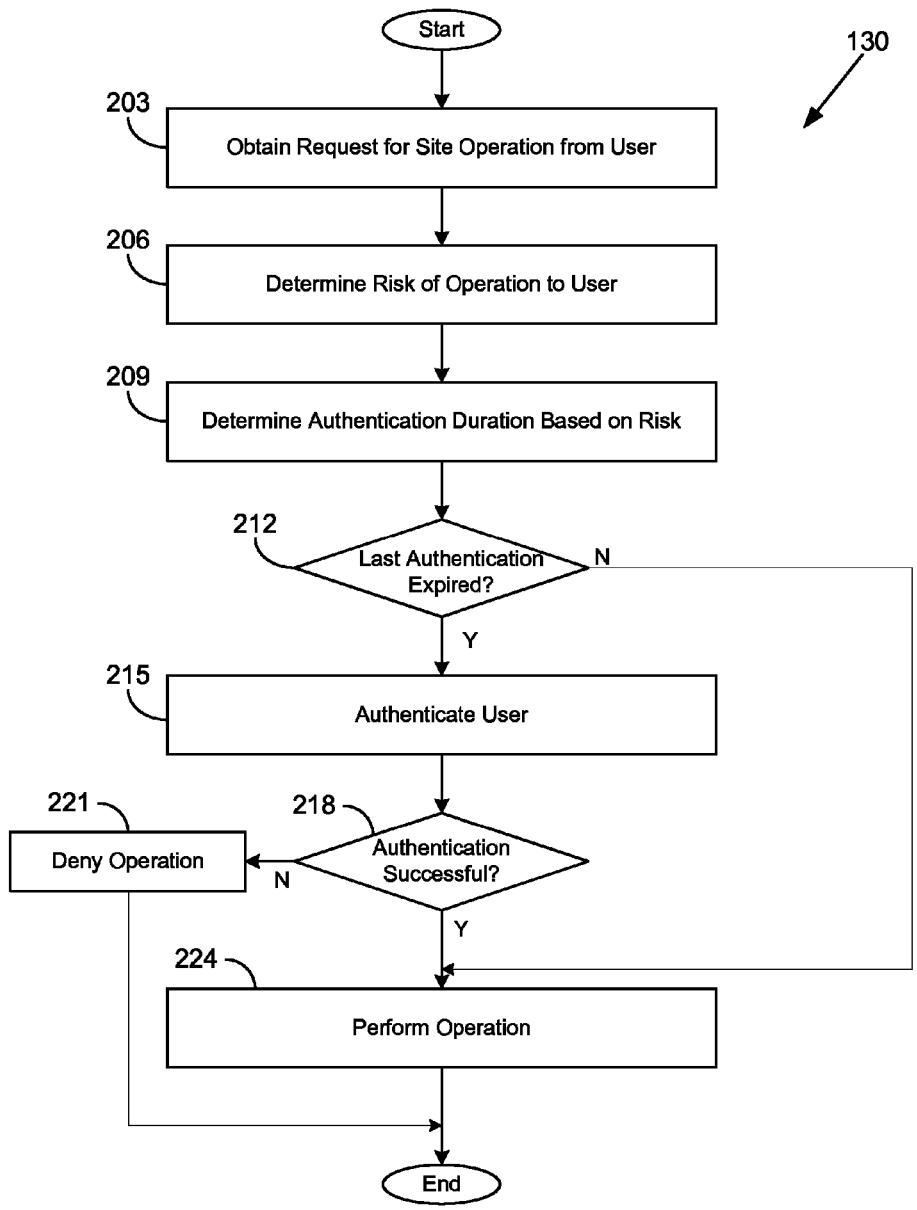
FIG. 2 is a flowchart illustrating one example of functionality implemented as portions of an authentication application executed in a computing device in the networked environment of FIG. 1, according to various embodiments of the present disclosure.

Referring next to FIG. 2, shown is a flowchart that provides one example of the operation of a portion of the authentication application 130 according to one embodiment. It is understood that the flowchart of FIG. 2 provides merely an example of the many different types of functional arrangements that may be employed to implement the operation of the portion of the authentication application 130 as described herein. As an alternative, the flowchart of FIG. 2 may be viewed as depicting an example of steps of a method implemented in the computing device 103 (FIG. 1) according to one or more embodiments.

Beginning with box 203, the authentication application 130 obtains a request from a user to perform a particular operation on a network site. Next, at box 206, the authentication application 130 determines a risk to the user of performing the operation. In some embodiments, the risk computation at box 206 involves a lookup table which maps a requested operation to the risk for that operation. In other embodiments, the risk value may be computed using a combination of the requested operation and other factors as input. Different factors may be given different weights, as should be appreciated.

The risk assessment performed at box 206 may consider factors that are intrinsic to the operation, such as the type of operation, or a dollar amount associated with the operation (e.g., a purchase amount). In one embodiment, operations on the network site are classified into create, read, update, or delete, with a different risk value assigned to each of these types. For example, read operations may be assigned the lowest risk and delete operations assigned the highest risk, with create and update being intermediary.

The risk assessment may also consider extrinsic factors such as client characteristics 127. In such embodiments, the authentication application 130 may communicate with the client device 106 in order to obtain the relevant client characteristics 127. One example of a client characteristic which affects the risk of an operation is a level of assurance that the client device 106 provides as to the identity of the user. For example, one client device may use username and password as security credentials, while another client device uses biometric data. The authentication application 130 may then determine that a network site operation requested by first client device represents a higher risk than the same operation requested by the second client device, since biometric data provides more assurance that the user truly is who he purports to be. In such a scenario, the risk assessment performed at box 206 produces a higher value for the biometric device than for the device without biometrics.

Another example of a client characteristic which affects the risk of an operation involves a history of the interaction between the client device 106 and the network site. The user's interactions with the network site are tracked by the client device 106, the electronic commerce application 133, and/or a combination thereof. The authentication application 130 retrieves this history and compares the user's historical interaction patterns with a snapshot of more recent activity. If the authentication application 130 determines that the user's recent activity does not match the historical pattern, the authentication application 130 may deem the risk to the user of performing a requested operation to be high. The degree of match may thus be used as a factor in computing risk.

Another example of a client characteristic which affects the risk of an operation is the current location of the client device 106. The authentication application 130 may maintain a list of locations and a risk factor associated with each. The perceived risk may be based on the risk of fraud in specific locations (e.g., if a particular city or country is known for a high rate of electronic fraud) or based on the increased risk of fraud in a location that is not typical for the user. In some embodiments, the user may specify a whitelist of acceptable locations and a blacklist of unacceptable locations. In such embodiments, the authentication application 130 maps the acceptable locations to a low risk factor and the unacceptable locations to a high risk factor.

Another example of a client characteristic which affects the risk of an operation is the current hardware and/or software configuration of the client device 106. For example, a client configuration with a particular operating system may be considered high risk because this operating system is known to be vulnerable to malicious attack, while a client configuration with another operating system may be considered low risk because the operating system itself includes strong security features. As another example, a client configuration in which many software patches and/or updates are applied may be considered low risk as compared to another configuration with outdated software. As yet another example, a client configuration in which malicious software is detected may be considered high risk while a client configuration on which a malware detector is installed may be considered low risk.

At box 209, the authentication application 130 determines an authentication duration based on the risk determined at box 206. In some embodiments, risky operations produce shorter authentication durations. A particular range of risk values may be mapped to a particular duration. For example, a risk value from 80 to 100 may map to an authentication duration of one minute, a risk value from 50 to 79 may map to a duration of five minutes, a risk value of 35 to 49 may map to a duration of thirty minutes, a risk value of 20 to 34 may map to a duration of one hour, a risk value of 10 to 19 may map to a duration of twelve hours, and a risk value under 10 may map to a duration of twenty-four hours. Alternatively, the duration may be computed directly from the risk value, so that a risk value of 45 produces a lower duration than a risk value of 40. In these examples, duration decreases as risk value increases. However, in other embodiments, a "low" risk may instead be represented by a large numeric value, and in such cases, duration increases as risk value increases.

In some embodiments, the determination of risk based on a particular operation (box 206) and the determination of duration from risk (box 209) are coalesced into a single operation. That is, instead of separately mapping the operation to a risk value and then mapping the risk value to an authentication duration, the operation may be mapped directly to an authentication duration.

Next, at box 212, the authentication application 130 determines whether the user's most recent authentication has expired, based on the authentication duration determined at box 209. Authentication of a particular user is associated with a session, which begins at the time the most recent authentication was successfully performed and ends when the user logs off or when the authentication duration period has passed. If at box 212 it is determined that the authentication is still in effect for the user's session (i.e., not yet expired), then processing continues at box 224, where the network site operation requested by the user at box 203 is performed. The processing of FIG. 2 is then complete.

If, however at box 212 it is determined that the authentication for the user's session has expired, then processing continues at box 215, where authentication of the requesting user is performed by the authentication application 130. Next, at box 221 the authentication application 130 determines whether the authentication was successful. If the authentication performed at box 215 was successful, then processing continues at box 224, where the network site operation requested by the user at box 203 is performed. The processing of FIG. 2 is then complete. If at box 212 it is determined that the authentication was not successful, then processing continues at box 221, where the network site operation requested by the user at box 203 is denied. The processing of FIG. 2 is then complete.

Figure 3:
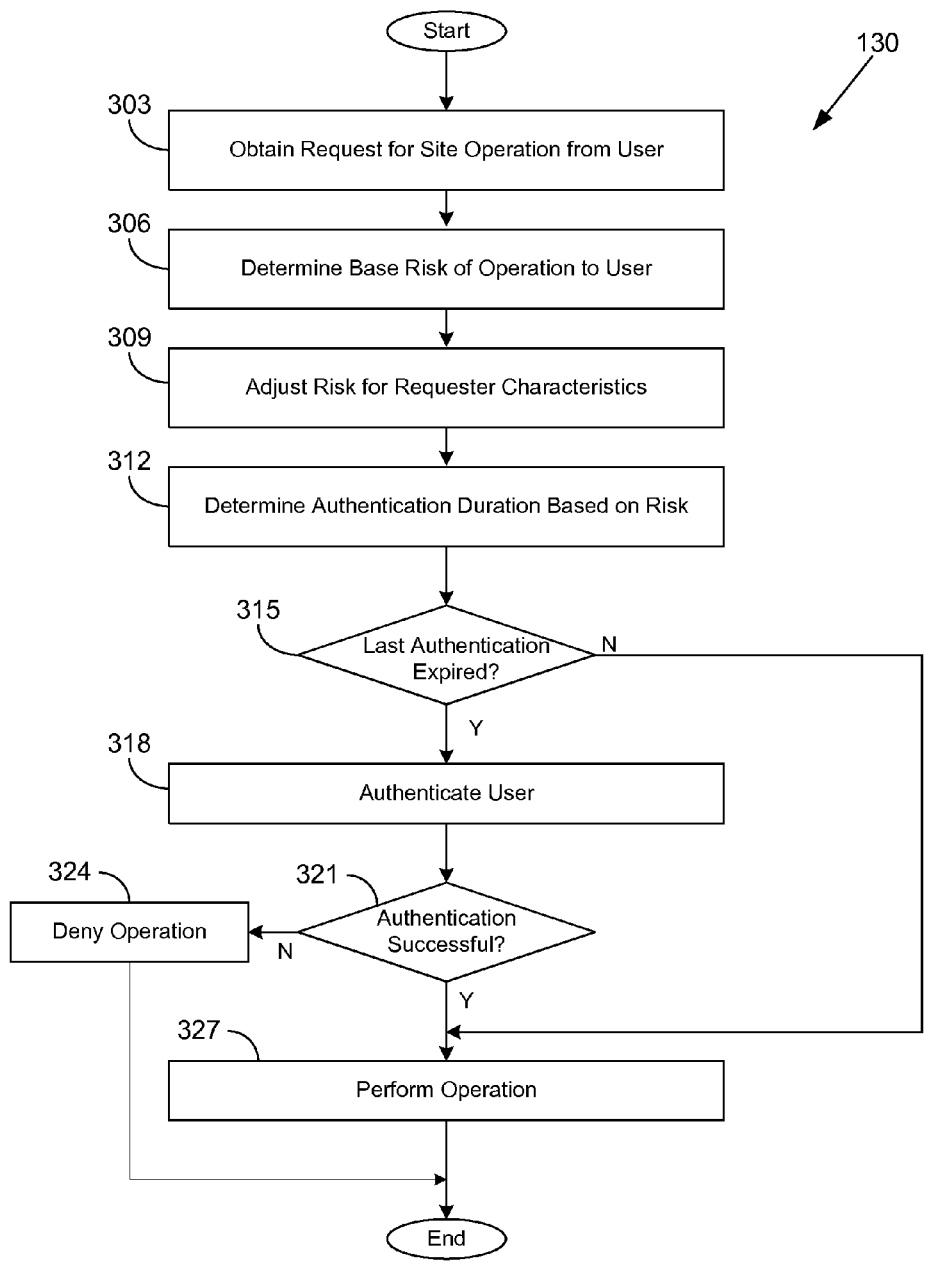
FIG. 3 is a flowchart illustrating another example of functionality implemented as portions of an authentication application executed in a computing device in the networked environment of FIG. 1, according to various embodiments of the present disclosure.

Moving on to FIG. 3, shown is a flowchart that provides another example of the operation of a portion of the authentication application 130 according to one embodiment. It is understood that the flowchart of FIG. 3 provides merely an example of the many different types of functional arrangements that may be employed to implement the operation of the portion of the authentication application 130 as described herein. As an alternative, the flowchart of FIG. 3 may be viewed as depicting an example of steps of a method implemented in the computing device 103 (FIG. 1) according to one or more embodiments.

The embodiment described in connection with FIG. 3 explicitly includes determining a base risk which is then adjusted based on secondary factors. In other respects, the embodiment of FIG. 3 may be considered similar to the embodiment of FIG. 2. Thus, various details discussed in connection with FIG. 2 are not necessarily repeated in the discussion of FIG. 3.

Beginning with box 303, the authentication application 130 obtains a request from a user to perform a particular operation on a network site. Next, at box 306, the authentication application 130 determines a base risk to the user of performing the operation. In some embodiments, this base risk corresponds to risk which is intrinsic to the operation itself, as opposed to risk which instead originates from the requesting client device 106. One such intrinsic factor may be the type of operation. Another such intrinsic factor may be a dollar amount associated with the operation (e.g., a purchase amount). In one embodiment, operations on the network site are classified into create, read, update, or delete, with a different base risk value assigned to each of these types. For example, read operations may be assigned the lowest base risk and delete operations assigned the highest base risk, with create and update being intermediary.

At box 309, the authentication application 130 adjusts the base risk to take into account one or more characteristics of the user making the request and/or characteristics of the client device in use by the requesting user. Various client characteristics 127 used as risk factors were already discussed in connection with FIG. 2 and will not be repeated here. Next, at box 312, the authentication application 130 determines an authentication duration based on the adjusted risk determined at box 309. Various mechanisms for mapping risk to authentication duration were already discussed in connection with FIG. 2 and will not be repeated here.

Next, at box 315, the authentication application 130 determines whether the user's most recent authentication has expired, based on the authentication duration determined at box 312. Authentication of a particular user is associated with a session, which begins at the time the most recent authentication was successfully performed and ends when the user logs off or when the authentication duration period has passed. If at box 315 it is determined that the authentication is still in effect for the user's session (i.e., not yet expired), then processing continues at box 327, where the network site operation requested by the user at box 303 is performed. The processing of FIG. 3 is then complete.

If, however at box 315 it is determined that the authentication for the user's session has expired, then processing continues at box 318, where authentication of the requesting user is performed by the authentication application 130. Next, at box 321 the authentication application 130 determines whether the authentication was successful. If the authentication performed at box 318 was successful, then processing continues at box 327, where the network site operation requested by the user at box 303 is performed. The processing of FIG. 3 is then complete. If at box 318 it is determined that the authentication was not successful, then processing continues at box 324, where the network site operation requested by the user at box 303 is denied. The processing of FIG. 3 is then complete.

Figure 4:
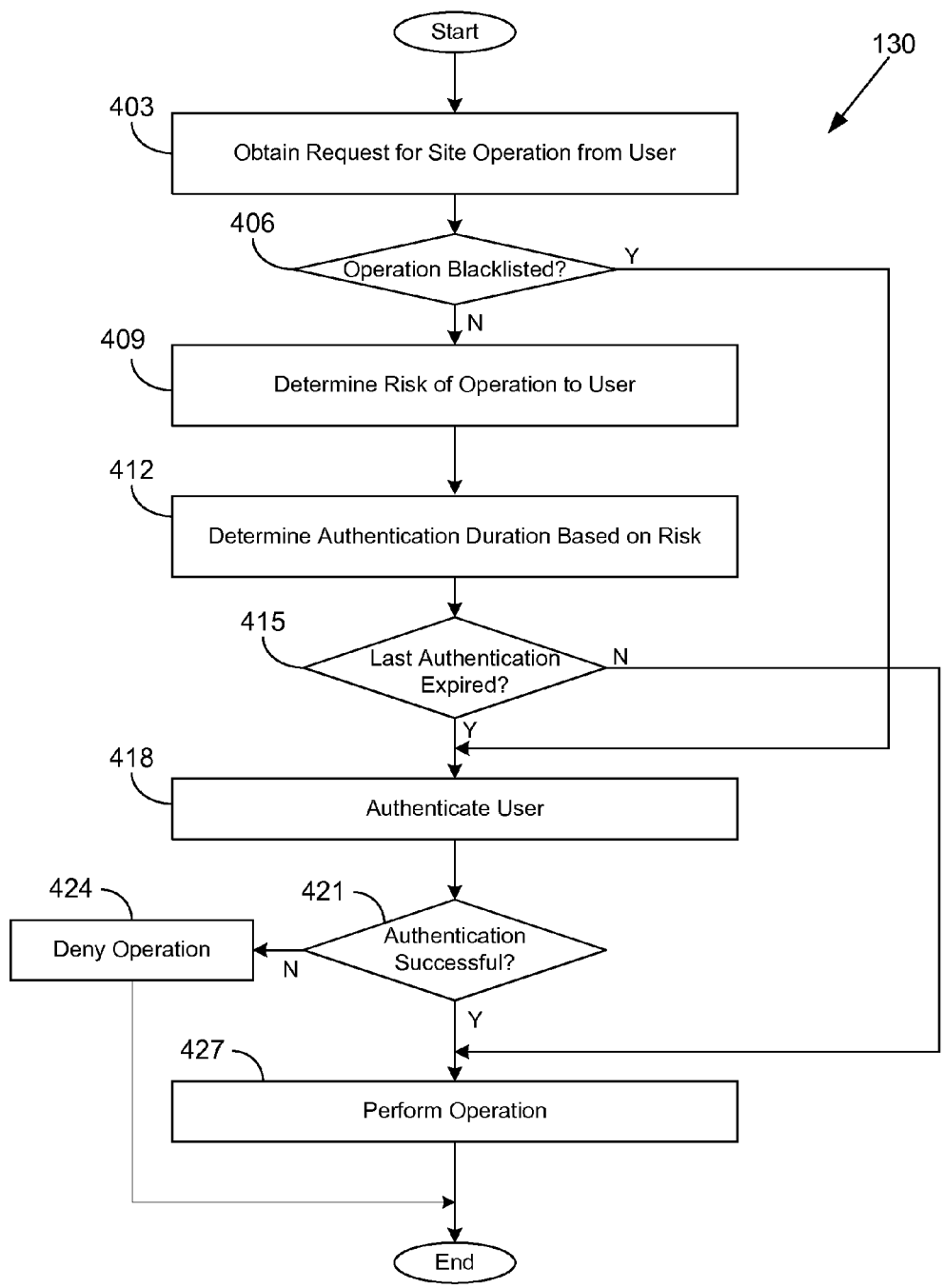
FIG. 4 is a flowchart illustrating yet another example of functionality implemented as portions of an authentication application executed in a computing device in the networked environment of FIG. 1, according to various embodiments of the present disclosure.

Turning now to FIG. 4, shown is a flowchart that provides one example of the operation of a portion of the authentication application 130 according to one embodiment. It is understood that the flowchart of FIG. 4 provides merely an example of the many different types of functional arrangements that may be employed to implement the operation of the portion of the authentication application 130 as described herein. As an alternative, the flowchart of FIG. 4 may be viewed as depicting an example of steps of a method implemented in the computing device 103 (FIG. 1) according to one or more embodiments.

Beginning with box 403, the authentication application 130 obtains a request from a user to perform a particular operation on a network site. Next, at box 406, the authentication application 130 determines whether the requested operation is on the operations blacklist 117. If the requested operation is blacklisted, the authentication application 130 continues processing at box 418 so that re-authentication will be forced regardless of the time of last authentication. In this manner, the function of computing an authentication duration is bypassed for operations which are considered extremely risky. If it is determined at box 406 that the requested operation is not blacklisted, then processing continues instead at box 409.

At box 409, the authentication application 130 determines the risk to the user of performing the operation. Various mechanisms for mapping the intrinsic and/or extrinsic characteristics of an operation to risk were already discussed in connection with FIG. 2 and will not be repeated here. Next, at box 412, the authentication application 130 determines an authentication duration based on the risk determined at box 406. Various mechanisms for mapping risk to authentication duration were already discussed in connection with FIG. 2 and will not be repeated here.

Next, at box 415, the authentication application 130 determines whether the user's most recent authentication has expired, based on the authentication duration determined at box 412. Authentication of a particular user is associated with a session, which begins at the time the most recent authentication was successfully performed and ends when the user logs off or when the authentication duration period has passed. If at box 415 it is determined that the authentication is still in effect for the user's session (i.e., not yet expired), then processing continues at box 427, where the network site operation requested by the user at box 403 is performed. The processing of FIG. 4 is then complete.

If, however at box 415 it is determined that the authentication for the user's session has expired, then processing continues at box 418, where authentication of the requesting user is performed by the authentication application 130. Next, at box 421 the authentication application 130 determines whether the authentication was successful. If the authentication performed at box 418 was successful, then processing continues at box 427, where the network site operation requested by the user at box 403 is performed. The processing of FIG. 4 is then complete. If at box 421 it is determined that the authentication was not successful, then processing continues at box 424, where the network site operation requested by the user at box 403 is denied. The processing of FIG. 4 is then complete.

Figure 5:
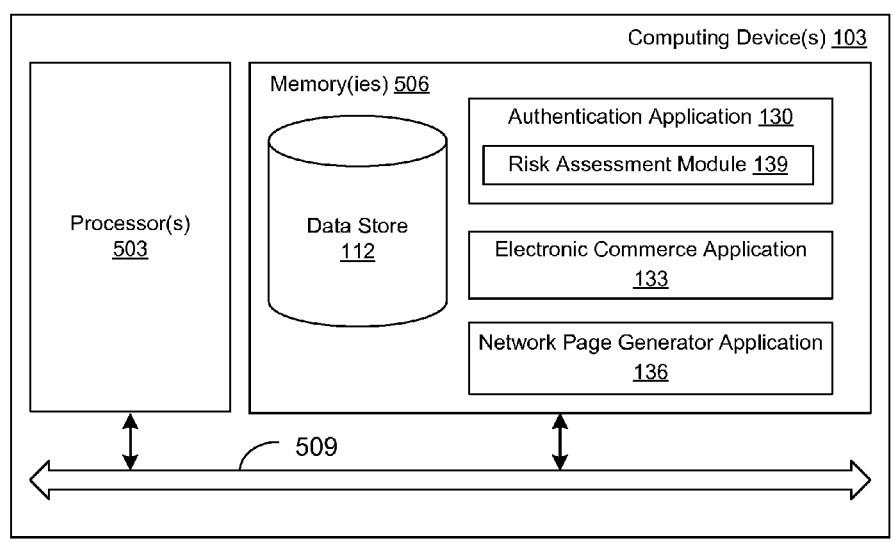
FIG. 5 is a schematic block diagram that provides one example illustration of a computing device employed in the networked environment of FIG. 1, according to various embodiments of the present disclosure.

With reference now to FIG. 5, shown is a schematic block diagram of the computing device 103 according to an embodiment of the present disclosure. The computing device 103 includes at least one processor circuit, for example, having a processor 503 and a memory 506, both of which are coupled to a local interface 509. To this end, the computing device 103 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the authentication application 130, the electronic commerce application 133, the network page generation application 136, the risk assessment module 139, and potentially other applications. Also stored in the memory 506 may be a data store 112 and other data. In addition, an operating system may be stored in the memory 506 and executable by the processor 503. While not illustrated, the client device 106 also includes components like those shown in FIG. 5, whereby the browser 142 is stored in a memory and is executable by a processor.

It is understood that there may be other applications that are stored in the memory 506 and are executable by the processors 503 as can be appreciated. Where any component discussed herein is implemented in the form of software, any one of a number of programming languages may be employed such as, for example, C, C++, C#, Objective C, Java, JavaScript, Perl, PHP, Visual Basic, Python, Ruby, Delphi, Flash, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors and the memory 506 may represent multiple memories that operate in parallel processing circuits, respectively. In such a case, the local interface 509 may be an appropriate network 109 (FIG. 1) that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the authentication application 130, the electronic commerce application 133, the network page generation application 136, the risk assessment module 139, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 2 shows the functionality and operation of an implementation of portions of the authentication application 130. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowcharts of FIG. 2 show a specific order of execution, it is understood that the order of execution may differ from that which is depicted. For example, the order of execution of two or more blocks may be scrambled relative to the order shown. Also, two or more blocks shown in succession in FIG. 2 may be executed concurrently or with partial concurrence. Further, in some embodiments, one or more of the blocks shown in FIG. 2 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the authentication application 130, the electronic commerce application 133, the network page generation application 136, the risk assessment module 139, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

For the Examiner's convenience, Applicants note that this application is a continuation of U.S. application Ser. No. 12/749,567. The claims of the present application are different and possibly, at least in some aspects, broader in scope than the claims pursued in the parent application. To the extent any prior amendments or characterizations of the scope of any claim or cited document made during prosecution of the parent could be construed as a disclaimer of any subject matter supported by the present disclosure, Applicants hereby rescind and retract such disclaimer. Accordingly, the references previously presented in the parent applications may need to be revisited.

Therefore, the following is claimed:

1. A computer-implemented method, comprising:
   obtaining, via at least one of one or more computing devices, a plurality of whitelist operations to be performed on a network site and a plurality of blacklist operations to be performed on a network site from a user;
   determining, via at least one of the one or more computing devices, an authentication duration for the user based at least in part on a risk of performing an operation in response to obtaining a request from the user for the operation, the authentication duration based at least in part on the operation being one of the plurality of blacklist operations or one of the plurality of whitelist operations; and
   initiating, via at least one of the one or more computing devices, an authentication procedure to re-authenticate the user in response to determining that a current session for the operation has expired based at least in part on the authentication duration.

2. The method of claim 1, wherein the authentication procedure comprises mapping the risk to the authentication duration.

3. The method of claim 1, wherein the risk is determined based at least in part on a type of the operation.

4. The method of claim 1, further comprising allowing, via at least one of the one or more computing devices, the user to perform the operation without initiating the authentication procedure to re-authenticate in response to determining that the operation is one of the plurality of whitelist operations.

5. The method of claim 1, further comprising immediately initiating, by the computing device, the authentication procedure to re-authenticate the user in response to determining that the operation is the one of the plurality of blacklist operations.

6. The method of claim 1, wherein the risk comprises a risk of economic harm to the user.

7. The method of claim 1, wherein the risk comprises a risk of fraud on an account of the user.

8. The method of claim 1, wherein the individual ones of the plurality of blacklist operations are associated with a respective blacklist location, and wherein the individual ones of the plurality of whitelist operations are associated with a respective whitelist location.

9. The method of claim 1, wherein the authentication duration associated with the individual ones of the plurality of whitelist operations is longer relative to the authentication duration associated with the individual ones of the plurality of blacklist operations.

10. The method of claim 1, wherein the authentication duration associated with the one of the plurality of whitelist operations does not expire.

11. A system, comprising:
at least one computing device; and
an authentication application executable in the at least one computing device, the authentication application comprising:
logic that obtains a plurality of whitelist operations and a plurality of blacklist operations from a user;
logic that computes a base risk for an operation in response to obtaining a request from the user for the operation, the base risk measuring a risk of performing the operation, the base risk based at least in part on whether the operation is one of the plurality of blacklist operations or one of the plurality of whitelist operations; and
logic that determines an authentication duration for the user based at least in part on the base risk, the authentication duration based at least in part on whether the operation is one of the plurality of blacklist operations or one of the plurality of whitelist operations.

12. The system of claim 11, further comprising logic that determines whether a current session associated with the user has expired based at least in part on the authentication duration.

13. The system of claim 11, further comprising logic that allows the user to perform the operation without re-authentication in response to determining that the operation is the one of the plurality of whitelist operations.

14. The system of claim 11, wherein the authentication application further comprises logic that adjusts the base risk by a secondary risk, the secondary risk measuring a risk to the user that originates from a client operated by the user.

15. The system of claim 11, further comprising logic that immediately re-authenticates the user in response to determining that the operation is the one of the plurality of blacklist operations.

16. The system of claim 11, wherein the authentication duration associated with the one of the plurality of whitelist operations does not expire.

17. The system of claim 11, wherein the blacklist operation is associated with a respective blacklist location, and wherein the whitelist operation is associated with a respective whitelist location.

18. A non-transitory computer-readable medium embodying a program executable by a computing device, the program comprising:
code that obtains a whitelist operation and a blacklist operation from a user;
code that determines an authentication duration for the whitelist operation and an authentication duration for the blacklist operation, the authentication duration for the whitelist operation being longer relative to the authentication duration for the blacklist operation;
code that obtains a request from the user for an operation;
code that re-authenticates the user upon expiration of the authentication duration for the whitelist operation in response to determining that the operation is the whitelist operation; and
code that re-authenticates the user upon expiration the authentication duration for the blacklist operation in response to determining that the operation is the blacklist operation.

19. The computer-readable medium of claim 18, further comprising code that immediately re-authenticates the user in response to determining that the operation is the blacklist operation.

20. The computer-readable medium of claim 18, further comprising code that allows the user to perform the operation without the re-authentication in response to determining that the operation is the whitelist operation.

* * * * *